United States Patent
Xu et al.

(10) Patent No.: US 9,178,641 B2
(45) Date of Patent: Nov. 3, 2015

(54) SUPPRESSION OF NON-LINEAR EFFECTS IN LOW DISPERSION OPTICAL FIBERS

(75) Inventors: Hai Xu, North Laurel, MD (US); Michael Francis Van Leeuwen, Bethesda, MD (US); Emily F. Burmeister, Silver Spring, MD (US); Stephen G. Grubb, Reisterstown, MD (US)

(73) Assignee: Infinera Corporation, Sunnyvale, CA (US)

( * ) Notice: Subject to any disclaimer, the term of this patent is extended or adjusted under 35 U.S.C. 154(b) by 285 days.

(21) Appl. No.: 13/177,170

(22) Filed: Jul. 6, 2011

(65) Prior Publication Data

US 2013/0011140 A1 Jan. 10, 2013

(51) Int. Cl.
 *H04J 14/02* (2006.01)
 *H04B 10/2525* (2013.01)
 *H04B 10/2563* (2013.01)

(52) U.S. Cl.
 CPC ............ *H04J 14/02* (2013.01); *H04B 10/2525* (2013.01); *H04B 10/2563* (2013.01); *H04B 10/25253* (2013.01)

(58) Field of Classification Search
 CPC ................ H04B 10/25253; H04B 10/2525
 USPC ................ 398/79, 188, 43, 81, 148
 See application file for complete search history.

(56) References Cited

U.S. PATENT DOCUMENTS

| | | | | |
|---|---|---|---|---|
| 5,875,045 A | * | 2/1999 | Sugiyama et al. | 398/94 |
| 5,978,122 A | * | 11/1999 | Kawazawa et al. | 398/81 |
| 6,690,886 B1 | * | 2/2004 | Guy | 398/81 |
| 6,934,077 B2 | * | 8/2005 | Stephens | 359/337.5 |
| 6,940,624 B1 | * | 9/2005 | Sardesai | 398/79 |
| 7,292,790 B1 | * | 11/2007 | Sardesai | 398/148 |
| 2001/0000442 A1 | * | 4/2001 | Okuno et al. | 359/124 |
| 2002/0003646 A1 | * | 1/2002 | Ishikawa | 359/161 |
| 2002/0041730 A1 | * | 4/2002 | Sercel et al. | 385/30 |
| 2003/0007216 A1 | * | 1/2003 | Chraplyvy et al. | 359/161 |
| 2003/0113084 A1 | * | 6/2003 | Knudsen et al. | 385/127 |
| 2004/0175083 A1 | * | 9/2004 | Puzey | 385/123 |
| 2005/0117862 A1 | * | 6/2005 | Carbone et al. | 385/123 |
| 2005/0175343 A1 | * | 8/2005 | Huang et al. | 398/66 |
| 2006/0045534 A1 | * | 3/2006 | Miyamoto et al. | 398/148 |
| 2006/0051039 A1 | * | 3/2006 | Wei | 385/123 |
| 2009/0174932 A1 | * | 7/2009 | Chang et al. | 359/345 |
| 2010/0129078 A1 | * | 5/2010 | Weston-Dawkes et al. | 398/79 |
| 2010/0158531 A1 | * | 6/2010 | Chung et al. | 398/79 |

* cited by examiner

*Primary Examiner* — David Payne
*Assistant Examiner* — Tanya Ngo
(74) *Attorney, Agent, or Firm* — Harrity & Harrity LLP; David L. Soltz

(57) ABSTRACT

Consistent with the present disclosure, chromatic dispersion is introduced into an optical communication path including multiple segments or spans of dispersion shifted fiber (DSF). The chromatic dispersion generates phase mismatching between optical signals propagating along the optical communication path, i.e., the optical signals are decorrelated, such that mixing products are reduced inmagnitude, and the noise attributable to four wave mixing is correspondingly reduced.

16 Claims, 11 Drawing Sheets

SUPPRESSION OF NON-LINEAR EFFECTS IN LOW DISPERSION OPTICAL FIBERS

BACKGROUND

In fiber optic communication systems, optical signals are modulated to carry symbols of data and are transmitted on an optical fiber from an optical transmitter to a receiver, such that a given symbol is transmitted during a symbol period. Although the optical signals are usually at a single nominal wavelength, each signal can include different spectral components. The spectral components of each optical signal can propagate through the transmission fiber at different speeds. This effect, known as "chromatic dispersion", can result in spectral components of one symbol period arriving at a receiver at substantially the same time as a succeeding symbol period, thereby causing degraded receiver sensitivity. Chromatic dispersion becomes increasingly pronounced at higher bit rates.

Early fiber optic communication systems included transmitters that output light having a wavelength of 1310 nm, which is the wavelength at which conventional single mode optical fiber has a substantially zero dispersion. The absorption of silica, a material from which optical fibers are made, is greater at 1310 nm than the absorption at 1550 nm. Accordingly, subsequent systems were developed to transmit optical signals at or near 1550 nm. Since conventional single mode optical fiber has significant chromatic dispersion at such wavelengths, so-called "dispersion shifted fiber" (DSF) was developed that has zero or substantially zero dispersion at 1550 nm.

In order to increase the data carrying capacity of fiber optic communication systems, wavelength division multiplexing has been deployed in which multiple transmitters output modulated optical signals at different wavelengths. The optical signals are then combined onto an optical fiber and transmitted as a wavelength division multiplexed (WDM) signal.

When a WDM signal is transmitted on DSF, however, optical signals that are spectrally close to one another in wavelength may remain correlated with one another over a long distance (phase-matching) due to the low dispersion in the fiber. Under such phase-matching conditions, the optical signals at different wavelengths can strongly interact with one another to generate additional optical components at other wavelengths (mixing products). Such mixing products may have the same or substantially the same wavelength as other optical signals in the WDM signal, and the magnitude of the mixing products is related to the distance over which the optical signals propagate and the frequency or wavelength spacing between such optical signals. Thus, if two spectrally close and phase matched optical signal propagate over long distances on DSF, the resulting mixing products may increase in magnitude, which may be observed as significant noise at one of the optical signal wavelengths. This non-linear effect, referred to as "four wave mixing", can introduce significant distortions and result in relatively high error rates. Optical signal wavelengths close to the zero dispersion wavelength of DSF are particularly susceptible to the effects of four wave mixing, such that a limited number of optical signals having wavelengths in the C-band are typically transmitted on DSF. Accordingly, optical networks including DSF often have substantially limited capacity. In addition, since the magnitude of the mixing products is related to the power of the optical signals, such optical networks typically launch optical signals with reduced power over shorter distances.

Therefore, non-zero dispersion-shifted fibers (NZDSF) have been developed that have a small chromatic dispersion in a wavelength range about 1550 nm (the "C-band", 1530 nm-1565 nm), with the zero dispersion wavelength lying just outside this range. Accordingly, the C-band wavelengths are not spectrally close to the zero-dispersion wavelength of NZ-DSF fibers, such that phase matching, as well as four wave mixing, is substantially reduced.

DSF fiber plants, however, are still in use, primarily due to the cost of replacing such fiber once it has been deployed. In order to increase the capacity of fiber optic networks including DSF, systems have been developed that include multiple transmitters which output optical signals in a wavelength range of 1565 nm to 1625 nm (the "L-band"). L-band transmitters, however, include lasers that can be more expensive than those provided in C-band transmitters.

Accordingly, there is a need for a high capacity, long-distance optical communication system that transmits optical signals in the C-band over DSF.

SUMMARY

Consistent with an aspect of the present disclosure, an apparatus is provided that comprises a and optical transmitter block that supplies a plurality of optical signals. Each of the plurality of optical signals has a corresponding one of a plurality of wavelengths and is modulated in accordance with a phase modulation format. An optical combiner is also provided that is configured to combine the plurality of optical signals and supply the plurality of optical signals as a wavelength division multiplexed signal to an optical communication path. The optical communication path includes a plurality of concatenated segments of dispersion shifted fiber (DSF). A plurality of segments of dispersion compensation fiber (DCF) is further provided. Each of the plurality of segments of DCF is configured to be coupled to the optical communication path, and each of the plurality of segments of DCF is provided between adjacent ones of the plurality of concatenated segments of DSF. Moreover, an optical receiver is provided that has an input coupled to an end portion of the optical communication path.

Consistent with further aspects of the present disclosure, a Q value associated with one of the plurality of optical signals having a wavelength substantially equal to 1550 nm is at least equal to 10, for example.

Consistent with an additional aspect of the present disclosure, a method is provided that comprises modulating each of a plurality of optical signals in accordance with a phase modulation format. Each of the plurality of optical signals has a corresponding one of a plurality of wavelengths. The method further includes combining the plurality of optical signals to provide a wavelength division multiplexed signal to an optical communication path, which includes a plurality of concatenated segments of dispersion shifted fiber (DSF). In addition, the method includes transmitting the plurality of optical signals through a plurality of segments of dispersion compensating fiber (DCF) provided along the optical communication path such that phases associated with the plurality of optical signals are decorrelated relative to one another from one DSF segment to the next.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DESCRIPTION OF THE EMBODIMENTS

Consistent with the present disclosure, chromatic dispersion is introduced into an optical communication path including multiple segments or spans of dispersion shifted fiber (DSF). The chromatic dispersion generates phase mismatching between optical signals propagating along the optical communication path, i.e., the optical signals are decorrelated, such that the sum of the mixing products is reduced in magnitude from one segment of DSF to the next, and the nonlinear noise attributable to four wave mixing is correspondingly reduced.

Reference will now be made in detail to the following exemplary embodiments of the present disclosure, which are illustrated in the accompanying drawings. Wherever possible, the same reference numbers will be used throughout the drawings to refer to the same or like parts.

Figure 1:
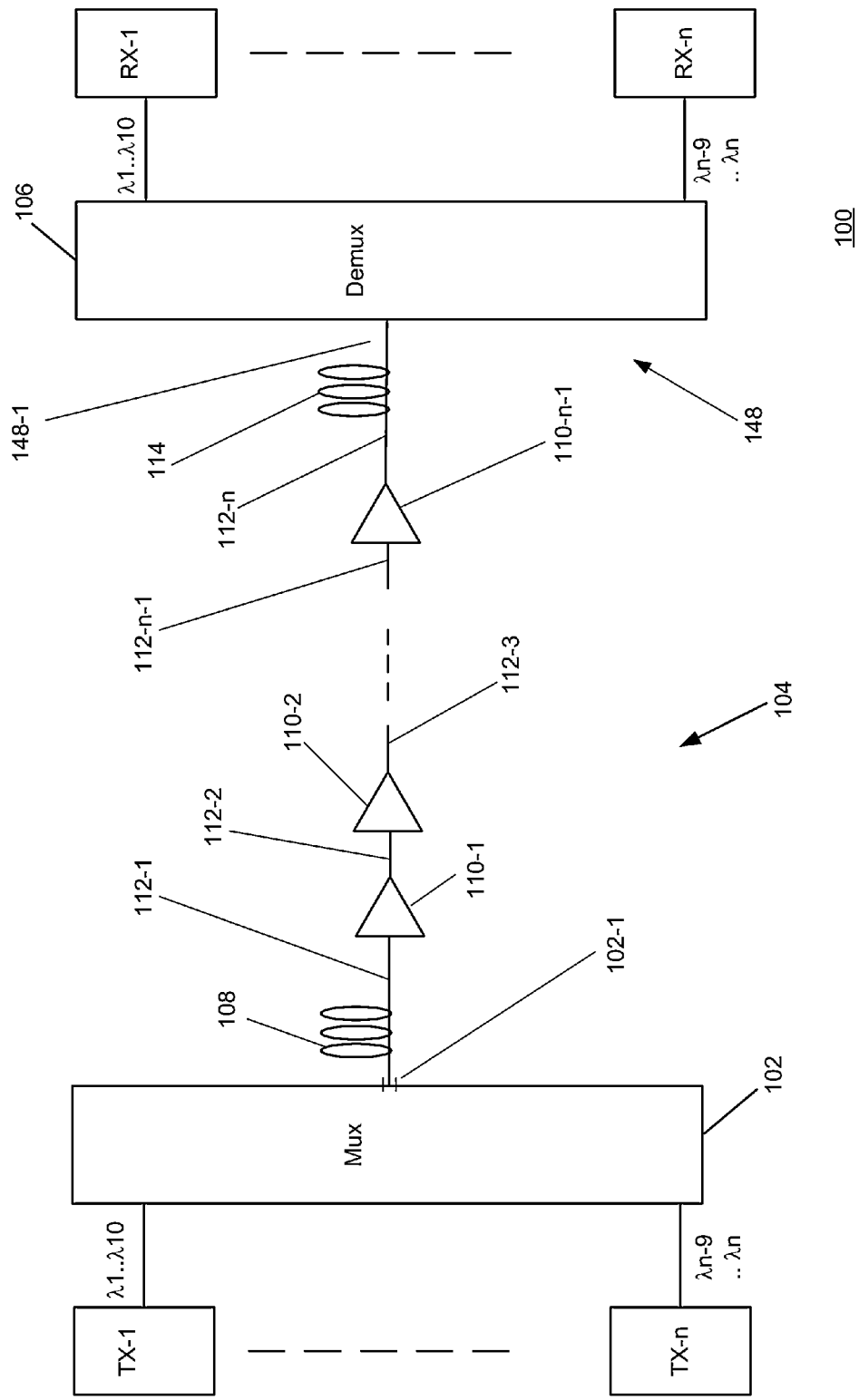
FIG. 1 illustrates an optical communication system consistent with an aspect of the present disclosure.

FIG. 1 illustrates an optical communication system 100 consistent with the present disclosure. Optical communication system 100 includes a plurality of optical transmitter blocks TX-1 to TX-n, each of which supplying a corresponding group of optical signals. Each of optical signal within each group has a corresponding one of a plurality of wavelengths. For example, optical transmitter block TX-1 outputs a first group or first plurality of optical signals, each of which having a corresponding one of a first plurality of wavelengths, such as wavelengths $\lambda 1$ to $\lambda 10$. In addition, optical transmitter block TX-n outputs a second group or second plurality of optical signals, each of which having a corresponding one of a second plurality of wavelengths, such as wavelengths $\lambda n-9$ to $\lambda n$.

Typically, wavelengths $\lambda 1$ to $\lambda n$ are uniformly spaced, spectrally, from one another, and are in the C-band. In one example, the minimum wavelength, $\lambda 1$, may be the lowest wavelength in the C-band or a wavelength equal to or substantially equal to 1530 nm, and the maximum wavelength, $\lambda n$, may be the greatest wavelength in the C-band or a wavelength equal to or substantially equal to 1570 nm. Typically, each optical signal carries a unique or different data stream or series of bits.

In one example, each of the optical signals is modulated to carry a particular data stream in accordance with a modulation format in which the phase of optical signal is modulated, such as quadrature phase shift keying (QPSK). In a further example, each optical signal is polarization multiplexed, such that each optical signal has a first component having a transverse electrical (TE) polarization, and a second component having a transverse magnetic (TM) polarization. The structure and operation of exemplary transmitters are further described in U.S. patent application Ser. No. 12/897,786, filed Oct. 5, 2010, and U.S. patent application Ser. No. 12/981,835, filed Dec. 30, 2010, the entire contents of both of which are incorporated herein by reference.

As further shown in FIG. 1 the optical signals output from transmitter blocks TX-1 to TX-n may be input to a known optical multiplexer 102, which combines and outputs the optical signals as a wavelength division multiplexed optical signal to optical communication path 104. Optical communication path 104 may include a concatenated plurality of segments or spans of dispersion shifted fiber (DSF) 112-1 to 112-n. A plurality of optical amplifiers 110-1 to 110-n-1 may also be provided, each of which being coupled to a respective one of DSF spans 112-1 to 112-n.

A segment of dispersion compensating fiber (DCF) 108 may be provided at output 108-1 of multiplexer 102 to introduce dispersion at a first end of 104-1 of optical communication path 104. Another segment of DCF 114 may optionally be provided at a second end 104-2 of optical communication path 104. In addition, as discussed in greater detail below, DCF segments may optionally be provided in each of optical amplifiers 110-1 to 110-n-1.

After propagating through optical communication path 104, the WDM signal is next provided to optical demultiplexer 106 of optical receiver node 148 via input 148-1. Optical demultiplexer 106 may be a known optical demultiplexer that demultiplexes or decombines the optical signal components of the WDM signal, and supplies each optical signal group to a corresponding receiver block RX-1 to RX-n for further processing. For example, optical signals in the first group having wavelengths $\lambda 1$ to $\lambda 10$ may be supplied to receiver block RX-1 and optical signals in the second group having wavelengths $\lambda n-9$ to $\lambda n$ may be supplied to receiver block RX-n.

Receiver block RX-1 will next be described in greater detail with reference to FIG. 2. It is understood that remaining receiver blocks RX-1 to RX-n have the same or similar structure as receiver block RX-1. In one example, each of Rx blocks RX-1 to RX-n constitutes a coherent intradyne receiver.

Receiver block RX-1 may include a receiver photonic integrated circuit (PIC) 202 provided on substrate 204. PIC 202 includes a known optical demultiplexer 203, such as a deinterleaver or an arrayed waveguide grating (AWG), that has an input that receives the first WDM optical signal portion having wavelengths $\lambda 1$ to $\lambda 10$, and supplies each wavelength component of the first WDM optical signal portion to a corresponding one of optical receiver circuits OR-1 to OR-10. Alternatively, demultiplexer 403 may be replaced by a known optical splitter or power splitter to supply a power split part of the first WDM optical signal portion to each of optical receiver circuits OR-1 to OR-10, and the data or information associated with each wavelength may be demodulated or demultiplexed in the electronic domain by circuitry provided in the receiver block RX-1. It is understood that, consistent with the present disclosure, the number of optical signals, and thus, the number of wavelengths, is not limited to the specific numbers of optical signals and wavelengths discussed herein. Rather, any appropriate number of optical signals and wavelengths, as well as transmitters and receivers, may be provided in accordance with the present disclosure. Details of optical receiver OR-1 are further described in above-noted U.S. patent application Ser. No. 12/981,835, filed Dec. 30, 2010.

Figure 2:
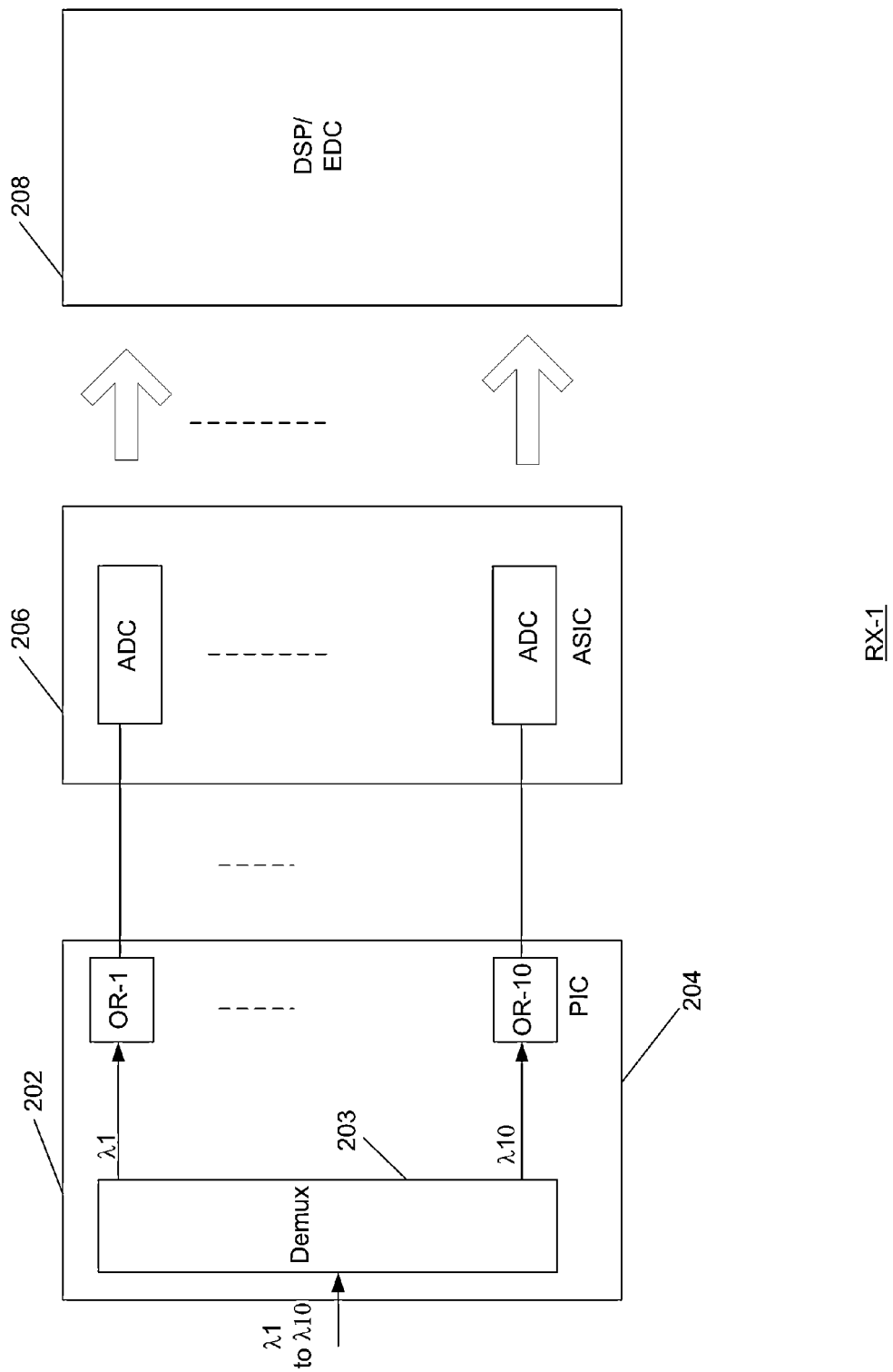
FIG. 2 illustrates an example of a receiver block consistent with an aspect of the present disclosure.

As further shown in FIG. 2, each optical receiver circuit OR-1 to OR-10 supplies a corresponding grouping of analog electrical signals to analog-to-digital conversion (ADC) circuits 206. Each analog electrical signal grouping is indicative of data carried by a respective wavelength component of the first WDM optical signal portion. Each ADC circuit may also include a known transimpedance amplifier and automatic gain control circuitry to adjust the voltage and/or current of the analog electrical signals.

ADC circuits 206 supply digital samples associated with each analog electrical signal grouping output by optical receiver circuits OR-1 to OR-10. These digital samples are then processed by DSP 208, which can determine various parameters associated with each spectral component of the first WDM optical signal portion, such as phase, magnitude, bit error rate (BER), and optical signal-to-noise ratio (OSNR), in a known manner. DSP 208 may also include circuitry to perform electronic dispersion compensation (EDC) to offset or correct for errors that may result from the dispersion introduced by the DCF segments discussed above. Examples of circuitry that may be used in connection with EDC are described in U.S. patent application Ser. No. 12/785,679 filed May 24, 2010, U.S. patent application Ser. No. 12/926,533 filed Nov. 23, 2010, and U.S. patent application Ser. No. 13/037,315 filed Feb. 28, 2011.

Figure 3:
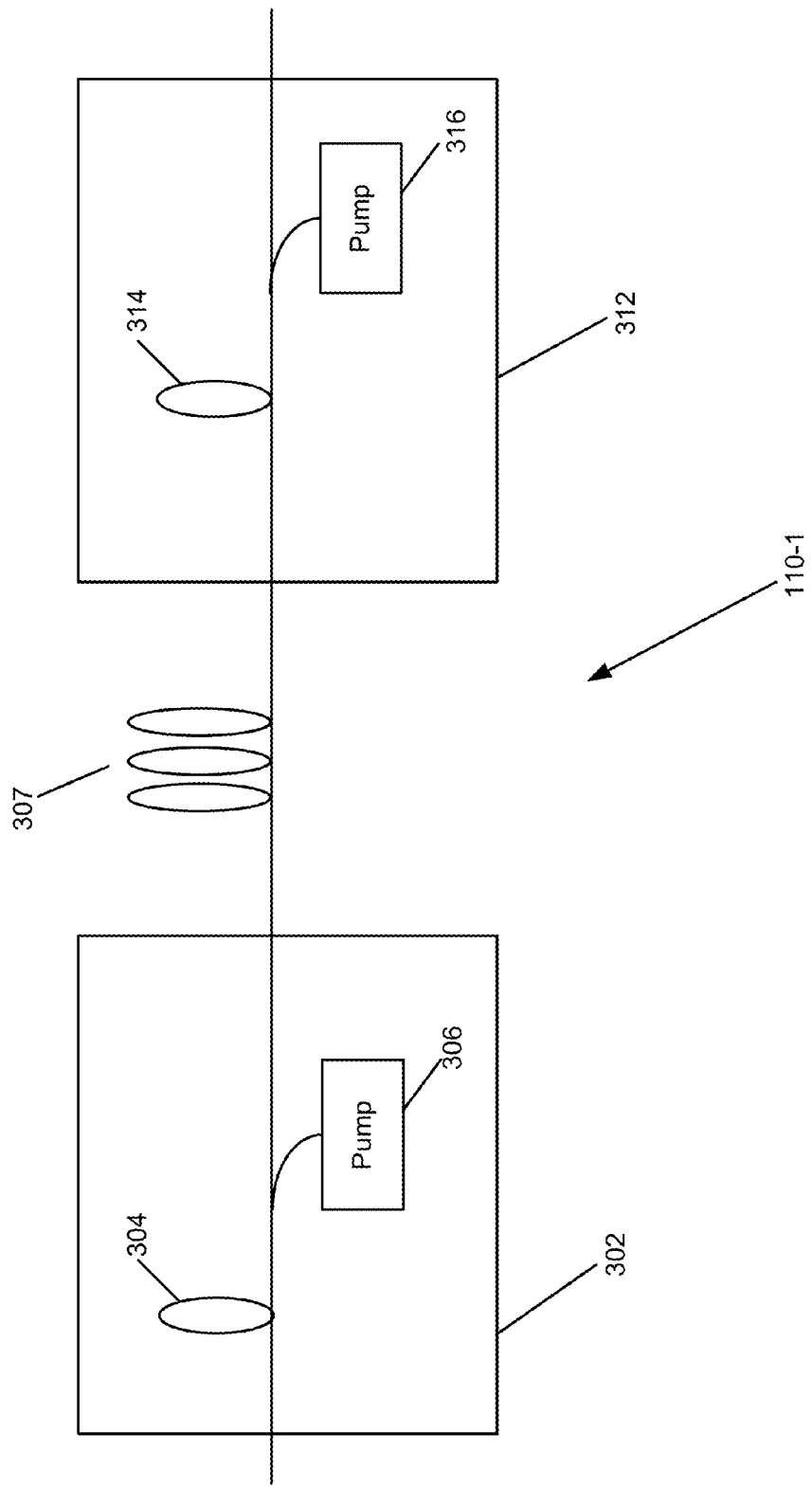
FIG. 3 illustrates an example of an optical amplifier consistent with the present disclosure.

As noted above, the WDM signal output from multiplexer 102 may be power boosted or amplified at various locations along optical communication path 104 by optical amplifiers 110-1 to 110-*n*-1. An exemplary optical amplifier 110-1 will next be described with reference to FIG. 3.

Amplifier 110-1 may include a first stage 302, which has a first segment of erbium doped fiber 304. A pump laser 306 may also be provided that pumps the erbium doped fiber 304 with pump light at a wavelength of 980 nm, for example. The WDM signal propagates through and is amplified by fiber 304. The WDM signal next propagates through optionally provided DCF 307 and then travels to second stage 312.

Second stage 312 includes a second segment of erbium doped fiber 314, which may have the same or different composition as erbium doped fiber 304. Pump laser 316 has a wavelength of 1480 nm, for example, or other suitable pump wavelength to activate fiber 314 that provides suitable gain to further amplify the WDM signal.

As discussed in greater detail below, DCF 307 in each optical amplifier may introduce an incremental amount of dispersion, such as 5, 10, 15, 20, 50, 100 ps/nm or some other amount of dispersion. The amount of incremental dispersion introduced in each optical amplifier 110-1 to 110-*n*-1 by DCF segments 307 may be the same or may different. Alternatively, some segments of DCF 307 may introduce a positive dispersion, while others may introduce a negative dispersion, while having the same or different magnitude of such dispersion. Moreover, certain segments of DCF 307 may introduce the same magnitude and/or sign of dispersion while others introduce a different magnitude and/or sign of dispersion. Further, instead of deploying incremental segments of DCF, a lumped or relatively long segment of DCF may be provided near transmitters TX-1 to TX-n or near receivers RX-1 to RX-n.

As generally understood, first and second data-carrying optical signals (having first and second wavelengths, respectively) propagating over a first segment or span of optical fiber can generate spurious signals or a mixing product at a third wavelength, for example. In a wavelength division multiplexed (WDM) system, a third data-carrying optical signal having the third wavelength may also be transmitted. Accordingly, in this example, the mixing product may have the same wavelength as the third data-carrying optical signal. If the first and second optical signals propagate to a second segment and have the same relative phase difference as at the beginning of the first segment, the mixing product generated in the second segment will add coherently to the mixing product generated in the first span, thereby increasing the magnitude of the sum of the mixing products. Moreover, as the in-phase or correlated first and second optical signals travel through additional successive spans, the mixing products generated in each span are in phase with one another and will further add coherently to one another, thereby further increasing the magnitude of the sum of the mixing products at the third wavelength and causing the third optical signal, also at the third wavelength in this example, to be corrupted and significantly degraded. Conventionally, in order to reduce the magnitude of the mixing products, the first and second optical signals are transmitted with a relatively low launch power, but doing so reduces the distance over which C-band optical signals may be transmitted in DSF. In addition, as noted above, four wave mixing has been reduced by providing optical signals that are spaced spectrally far apart from one another and are not close to the zero dispersion wavelength of DSF. As a result, limited capacity is obtained.

On the other hand, consistent with the present disclosure, the phase of the first and second optical signals may be shifted or offset relative to one another due to the presence of DCF, for example, in each successive span. Although four-wave mixing products may be generated in each span, such four wave mixing products are out of phase with one another. Here, the resulting four-wave mixing products typically have random phases that incoherently add with one another from one span to the next, such that the magnitude of the sum of the mixing products is significantly less than when the mixing products add coherently. Accordingly, the magnitude of the mixing products can be reduced, without reducing launch power, and spectrally dense C-band optical signals can be transmitted over greater distances in DSF. Long-distance, high capacity systems transmitting optical signals in the C-band can thus be realized on DSF.

As noted above, phase differences may be introduced by including one or more segments of DCF along (e.g., DCF 307) optical communication path 104. The additional chromatic dispersion caused by the DCF segments, however, may create additional signal distortions. Such chromatic dispersion induced distortions, however, may be corrected or offset by DSP 208, which, as noted above, may employ electronic dispersion compensation (EDC) circuitry. Alternatively, the chromatic dispersion may be corrected optically by including appropriate combinations of DCF having positive and negative dispersion, such that the net dispersion of optical communication path 307 is substantially offset or compensated. Preferably, the magnitude of the dispersion increment is sufficiently large such that no optical signal in the WDM signal experiences zero dispersion in any given span 112.

Figure 4:
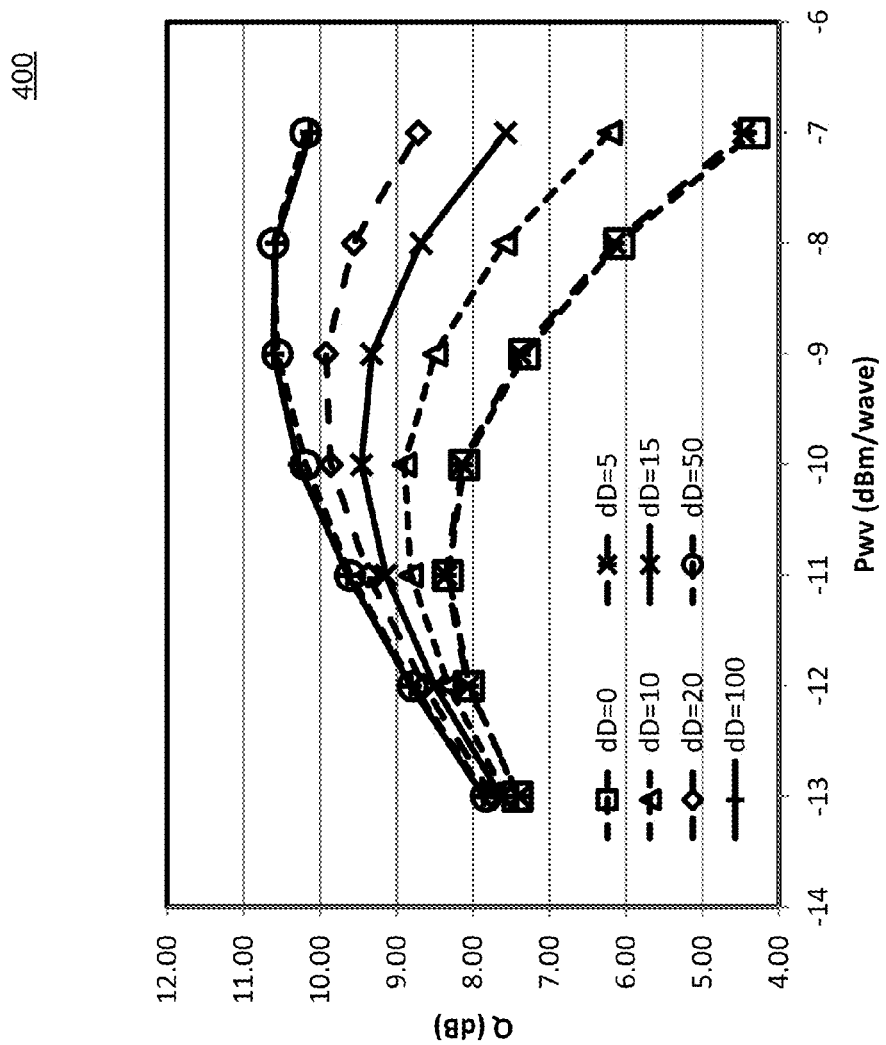
FIG. 4 illustrates a first family of exemplary curves, each representing quality factor (Q) versus power per wavelength for corresponding dispersion increment (dD)
Figure 5:
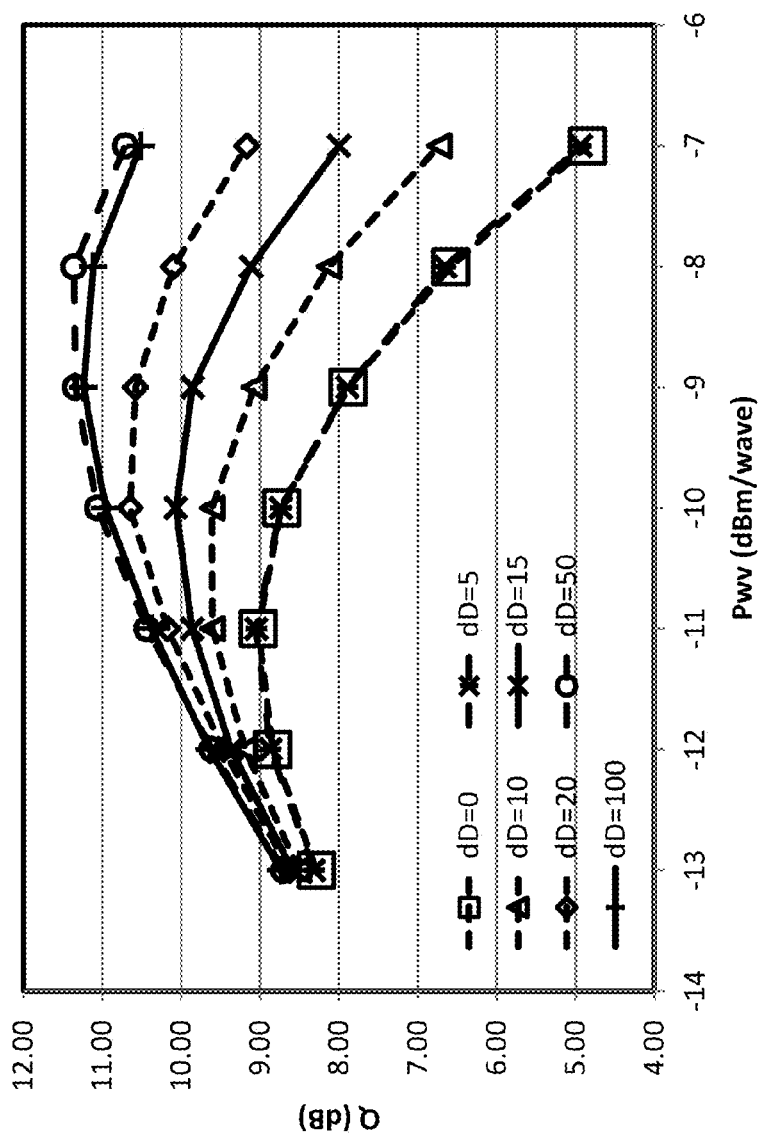
FIG. 5 illustrates a second family of exemplary curves, each representing quality factor (Q) versus power per wavelength for corresponding dispersion increment (dD)

FIG. 4 illustrates a family of curves 400, each associated with a different amount of incremental dispersion introduced by the DCF 307 in each optical amplifier 110. Each curve in family 400 represents simulated results of quality factor (Q), a parameter representing bit error rate (BER—i.e., a high Q corresponds to a lower bit error rate and a high signal-to-noise ratio) versus Pwv or power per wavelength for each increment (dD) of dispersion introduced into each span 112 (e.g., 0 ps/nm, 5 ps/nm, 10 ps/nm, 15 ps/nm, 20 ps/nm, 50 ps/nm, and 100 ps/nm). In FIG. 4, each optical signal is polarization multiplexed (e.g., has TE and TM components) and each is QPSK modulated at a data rate substantially equal to 100 Gbit/second. FIG. 5 similarly illustrates a family of curves (500) of Q factor verses power per wavelength for each increment of dispersion. Here, however, each optical signal is polarization multiplexed and each is QPSK modulated at a data rate substantially equal to 40 Gbit/second. Moreover, each curve represents simulated transmission over an optical communication path including 20 spans of DSF, each of which having a length of 80 km and a zero-dispersion wavelength approximately equal to 1550 nm. A version of MatLab, modified in a known manner, was used to generate the plots shown in FIGS. 4-8. MatLab is commercially available from MathWorks, Inc. In both FIGS. 4 and 5, the Q values are for optical signals or channels at wavelengths near 1550 nm.

As shown in FIGS. 4 and 5, for given power per wavelength, the corresponding Q factor is less if either no dispersion is introduced (curve dD=0) or the incremental dispersion is low (curve dD=5-15 ps/nm). As the amount of incremental dispersion introduced at each amplifier (110-1 to 110-n-1) by DCF 307 is increased (curves dD=10 (10 ps/nm), dD=15 (15 ps/nm), dD=20 (20 ps/nm), dD=50 (50 ps/nm)), the Q factor correspondingly increases. Accordingly, with increased dispersion, more optical signals with higher power can be launched than would be achievable if little or no dispersion were introduced. With such higher power, the optical signals can propagate over greater distances than could otherwise be achieved without such added dispersion, an advantage in long distance terrestrial and submarine systems. As further shown in FIGS. 4 and 5, the Q factor achieved by an incremental dispersion of 50 ps/nm is substantially the same as that achieved with an incremental dispersion of 100 ps/nm (note curve dD=100). Thus, increasing incremental dispersion by 50 ps/nm results in maximal increases in Q, if any.

FIGS. 6a-6d illustrate examples of "dispersion maps" (map1 to map 4) associated with the above noted 20 span system. Each dispersion map graphs the amount of accumulated dispersion versus distance of the optical communication path. In the scenario represented by map 1 (FIG. 6a), each DCF segment 307 introduces an incremental chromatic dispersion of +50 ps/nm for each span, such as span 112-1 shown in FIG. 1, up to a distance of approximately 900 km, and, for the remaining length of the optical communication path, each DCF segment 307 introduces an incremental chromatic dispersion of −50 ps/nm. Accordingly, at the end of the optical communication path (after propagation of 1600 km on path 104, for example), the net or accumulated chromatic dispersion is less than 100 ps/nm but greater than 0 ps/nm (an example of a non-zero chromatic dispersion at 1550 nm—other examples are presented herein). Here, as well as in FIG. 6c (discussed below) dispersion is substantially compensated or offset optically with combinations of DCF segments having both positive and negative dispersion.

Figure 6A:
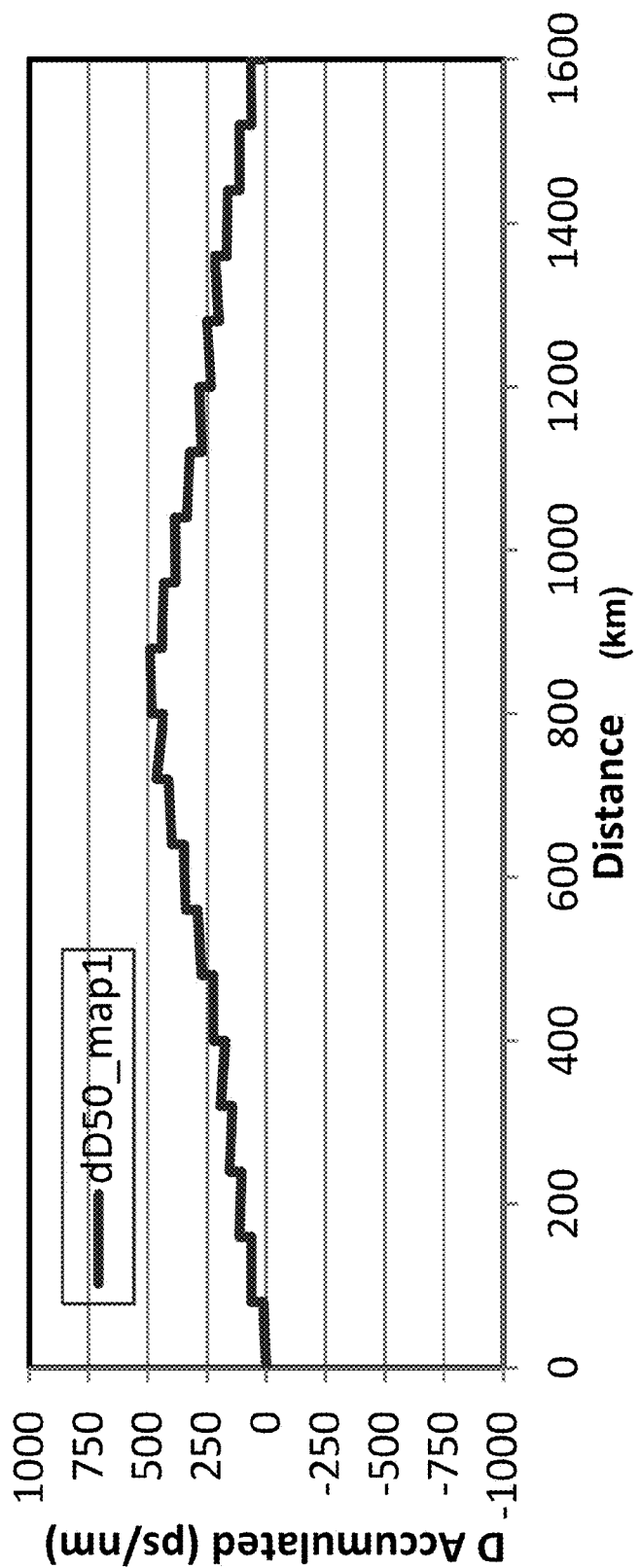
FIGS. 6a-6d illustrate exemplary dispersion maps consistent with the present disclosure.
Figure 6B:
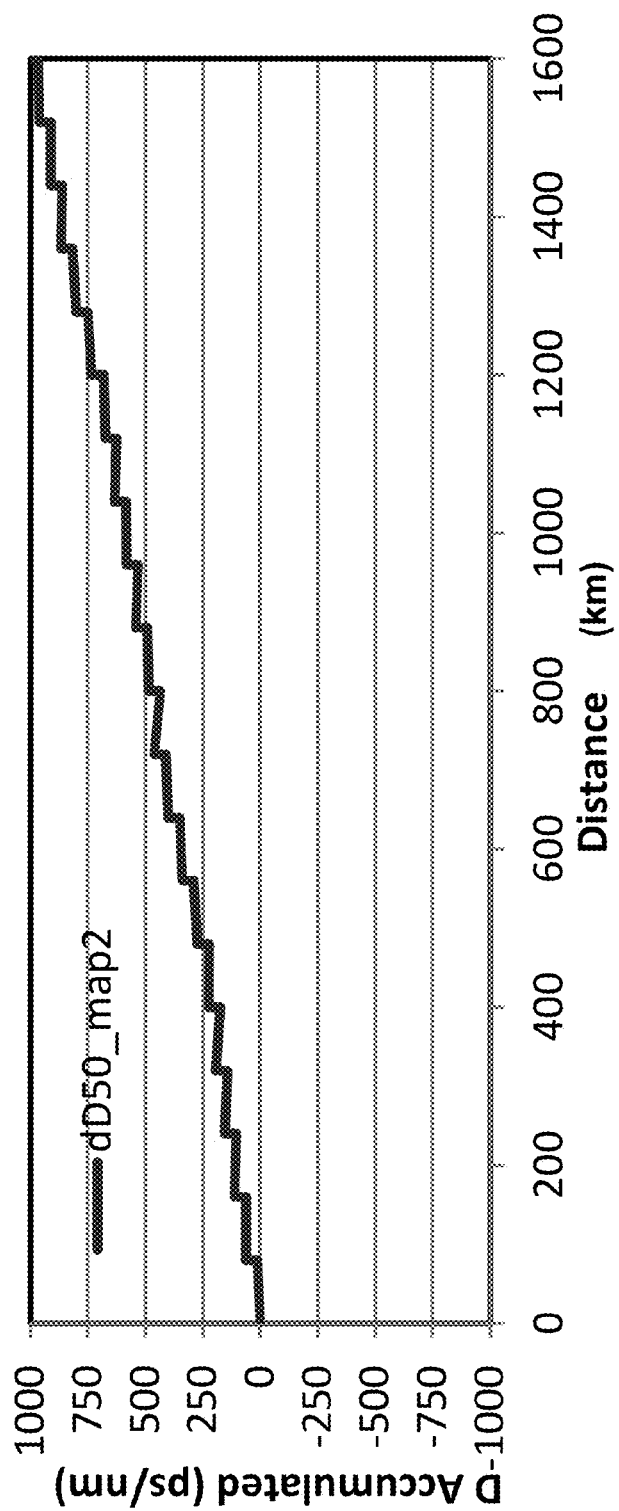
Figure 6C:
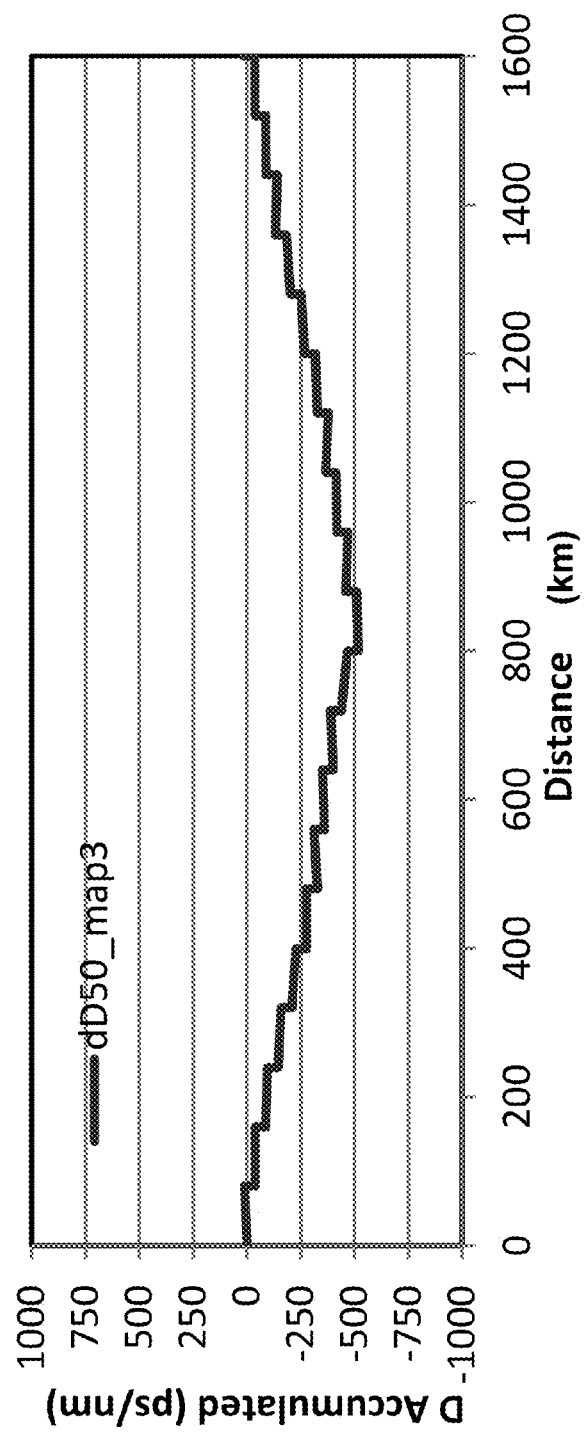
Figure 6D:
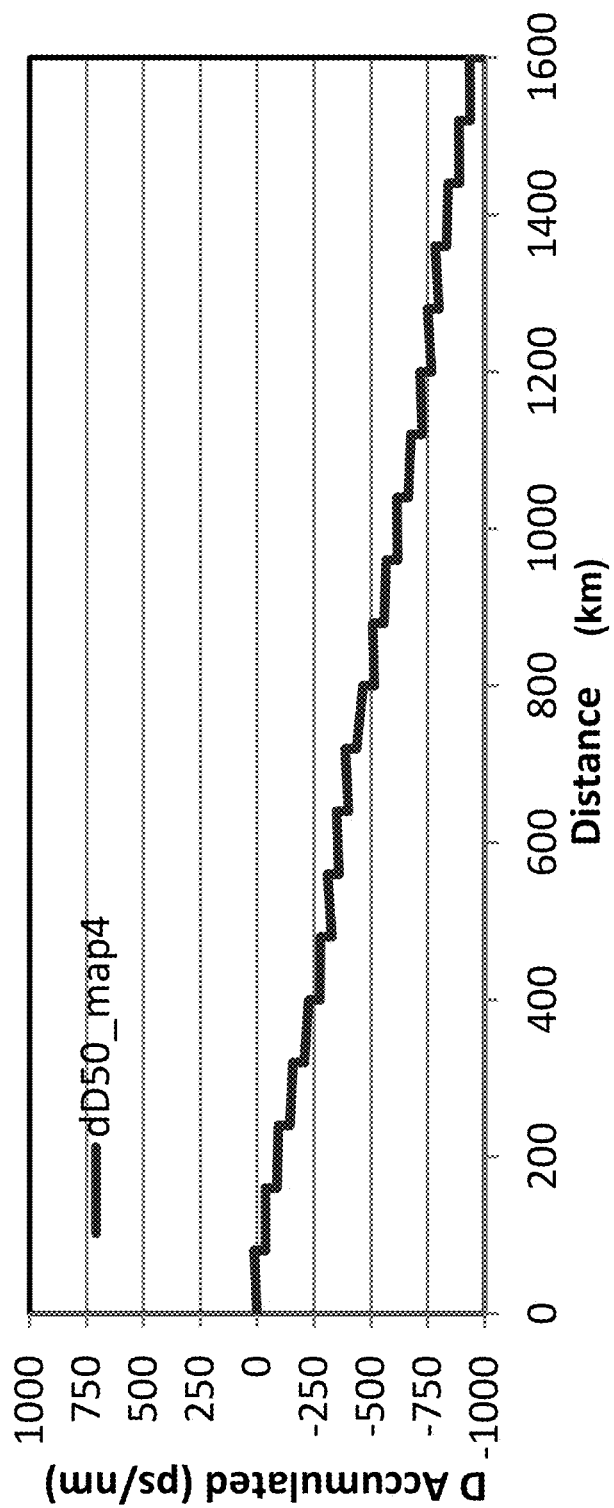

In map 2 shown in FIG. 6b, each DCF segment 307 introduces an incremental chromatic dispersion of +50 ps/nm for the entire length of the optical communication path 104, such that the accumulated dispersion is about 950 ps/nm. In addition, in map 3 (FIG. 6c), each DCF segment 307 introduces an incremental chromatic dispersion of −50 ps/nm for each span, such as span 112-1, for example, up to a distance of approximately 900 km, and, for the remaining length of the optical communication path, each DCF segment 307 introduces an incremental chromatic dispersion of +50 ps/nm. Thus, at the end of the optical communication path (after propagation of 1600 km), the net or accumulated chromatic dispersion is between 0 and −100 ps/nm. Further, as shown in FIG. 6d (map 4), each DCF segment 307 introduces an incremental chromatic dispersion of −50 ps/nm for the entire length of the optical communication path, such that the accumulated dispersion is about −950 ps/nm.

Figure 7:
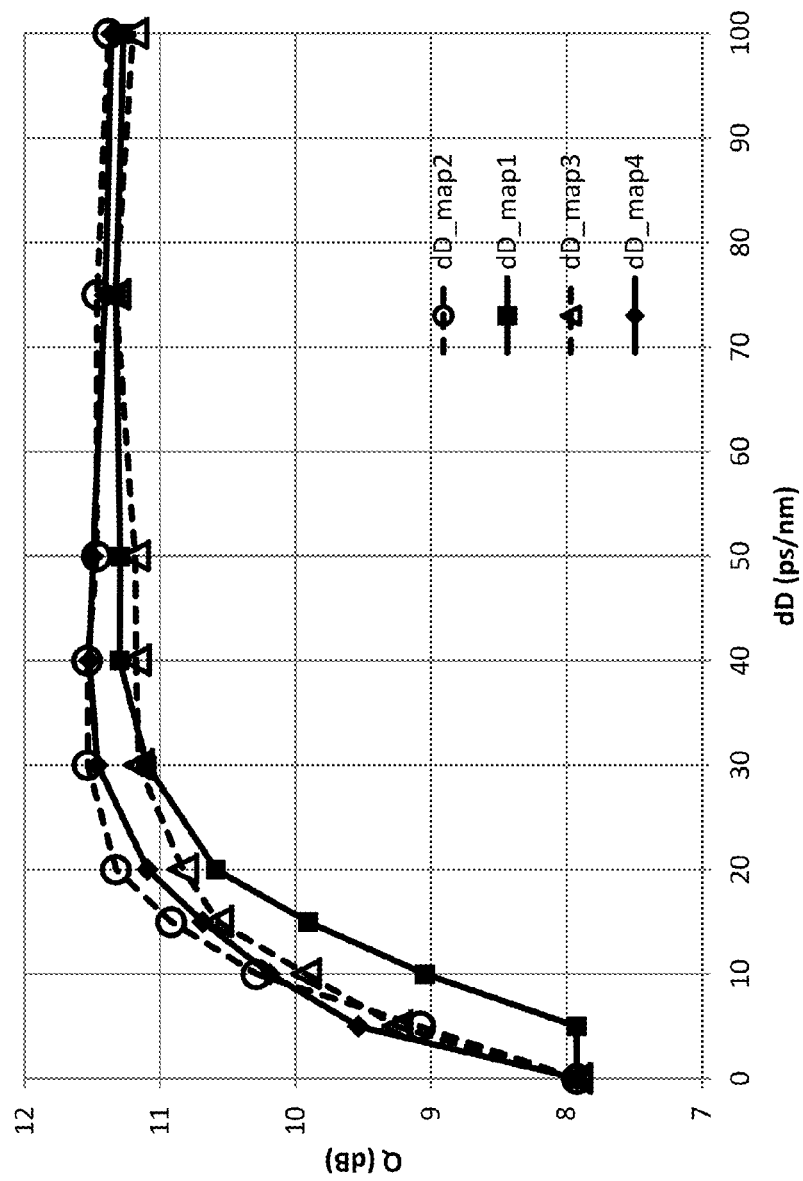
FIG. 7 illustrates a graph of Q factor versus incremental dispersion (dD) consistent with a further aspect of the present disclosure.

FIG. 7 illustrates plots of simulated Q factor values versus dispersion increment (dD) for each of maps 1 to 4. As shown in FIG. 7, Q is increased or improved as dD increases up to a dispersion increment of 50 ps/nm, and for dispersion increments about 100 ps/nm, little, if any, increase in Q are observed. As further shown in FIG. 7, Q increases more rapidly with increasing dD for maps 1 to 3 than for map 4. Thus, for a given dispersion increment, a higher Q may be observed for dispersion maps having a net positive dispersion or a net dispersion that is substantially equal to zero.

Figure 8:
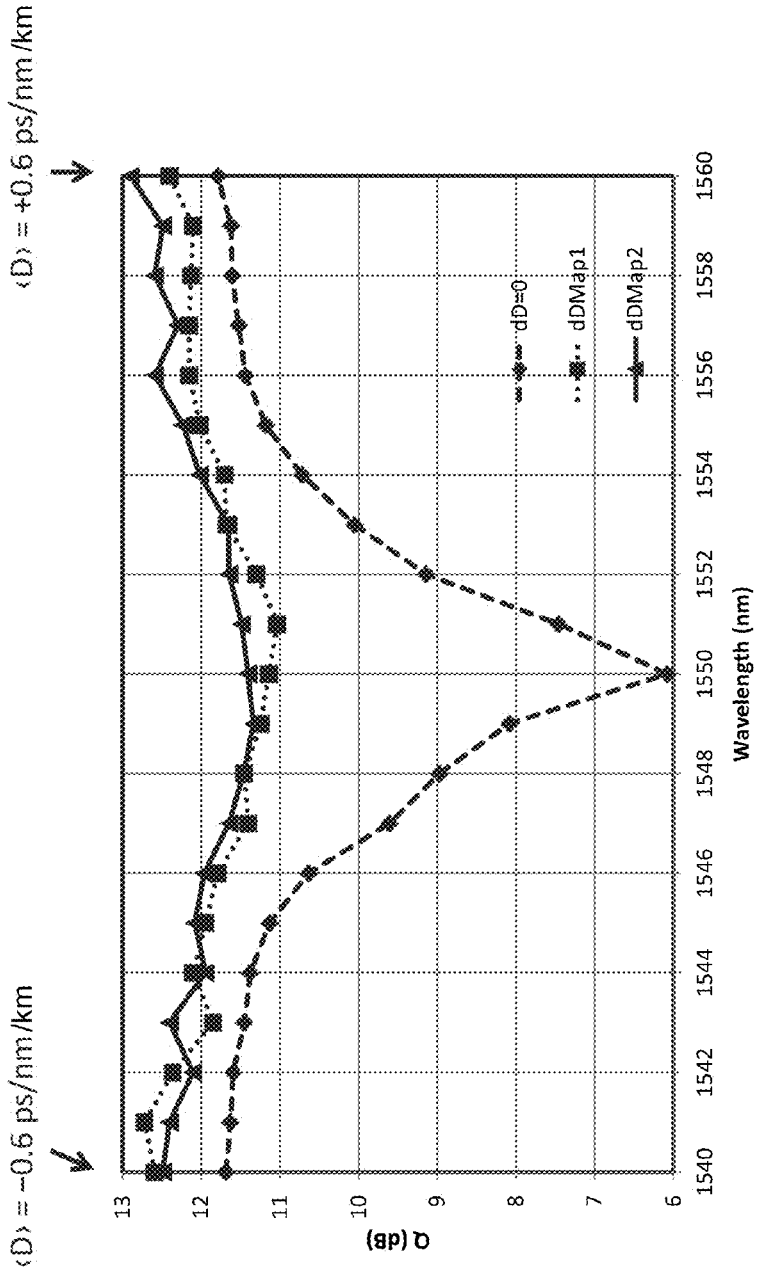
FIG. 8 illustrates a graph of Q versus wavelength consistent with an additional aspect of the present disclosure.

FIG. 8 illustrates Q factor versus wavelength in connection with the above noted 20 span (DSF) optical communication path in each of the following scenarios: no added dispersion (curve dD=0); map 1 (dDMap1); and map 2 (dDMap2). As shown in FIG. 8, when no dispersion is introduced, Q is decreased for optical signals having wavelengths in a range of about 1544 nm to 1556 nm, and the minimum Q of 6 dB is at the typical zero dispersion wavelength of DSF, 1550 nm. However, the Qs associated with maps 1 and 2 are each significantly higher than that when no dispersion is introduced, even at wavelengths outside the range of 1544 nm to 1556 nm. In particular, a Q factor values greater than 10 db, and in this instance 11 dB or greater can be obtained at the zero dispersion wavelength, which is 1550 nm in this example.

Typically, optical communication path 104 has a non-zero or residual chromatic dispersion at 1550 nm, when taken or measured at end 104-2, because, for example, the WDM signal is not entirely dispersion compensated. As noted above, electronic dispersion compensation (EDC) may be employed to compensate or correct for such residual chromatic dispersion.

Thus, by introducing dispersion into an optical communication path including concatenated DSF spans, non-linear effects, such as four wave mixing, may be reduced, thereby permitting transmission of optical signals in the C-band with higher capacity and power over greater distances. Such systems may also have reduced costs, since the components, such as lasers, associated with C-band transmission may be less expensive than that associated other wavelengths, such as in the L-band.

Other embodiments will be apparent to those skilled in the art from consideration of the specification. For example, the present disclosure is not limited to optical transmitter blocks that supply the above-described phase modulated optical signals. Transmitter blocks that supply optical signals that are modulated in accordance with an on-off keying (OOK) modulation format or other modulation formats. In addition, in FIG. 1, an optical amplifier may be provided at output 102-1 of multiplexer 102 in order to provide pre-amplification of the transmitted WDM signal. In addition, an optical amplifier may be provided at input 104-2 of receiver node 104 in order to provide post-amplification of the WDM signal. Such optical amplifiers may have a similar structure as optical amplifiers 110-1 to 110-n or may include one stage. Each of the above noted optical amplifiers may include erbium doped fiber amplifiers or another known optical amplifier, such as a semiconductor optical amplifier. Further, each span 112 may include a fiber, such as a "low dispersion fiber". Such low dispersion fiber may have a magnitude of dispersion that is 0/6 psn/nm/km or less and may include DSF. It is intended that the specification and examples be considered as exemplary only, with a true scope and spirit of the invention being indicated by the following claims.

What is claimed is:

1. An apparatus comprising:
an optical transmitter block supplying a plurality of optical signals,
each of the plurality of optical signals having a corresponding wavelength of a plurality of wavelengths, and
each of the plurality of optical signals being modulated in accordance with a phase modulation format;
an optical combiner configured to:
combine the plurality of optical signals, and
supply the plurality of optical signals as a wavelength division multiplexed signal to an optical communication path including a plurality of segments of dispersion shifted fiber (DSF);
a plurality of optical amplifiers coupled to the optical communication path,
each of the plurality of optical amplifiers being coupled between a respective first segment of the plurality of segments of DSF and a respective second segment of the plurality of segments of DSF,
a first optical amplifier, of the plurality of optical amplifiers, including a first segment of erbium doped optical fibers, a second segment of erbium doped optical fibers, and a first segment of dispersion compensation fiber (DCF) located between the first segment of erbium doped optical fibers and the second segment of erbium doped optical fibers,
the first segment of DCF having a positive dispersion that is at least 10 ps/nm, and
a second optical amplifier, of the plurality of optical amplifiers, including a third segment of erbium doped optical fibers, a fourth segment of erbium doped optical fibers, and a second segment of DCF located between the third segment of erbium doped optical fibers and the fourth segment of erbium doped optical fibers,
the second segment of DCF having a positive dispersion that is at least 10 ps/nm;
a plurality of other segments of DCF,
each of the other segments of DCF being different than the first segment of DCF and the second segment of DCF,
each of the plurality of other segments of DCF being coupled between the optical combiner and an optical decombiner; and
an optical receiver having an input coupled to an end portion of the optical communication path.

2. An apparatus in accordance with claim 1,
wherein the optical communication path has an associated non-zero chromatic dispersion at the input of the optical receiver.

3. An apparatus in accordance with claim 1, wherein each of the plurality of other segments of DSF has an associated chromatic dispersion that is substantially zero at 1550 nm.

4. An apparatus in accordance with claim 2, wherein the non-zero chromatic dispersion is associated with a wavelength of light of 1550 nm.

5. An apparatus in accordance with claim 1, wherein each of the plurality of optical signals carries a corresponding data stream of a plurality of data streams, each of the plurality of data streams being different from one another.

6. An apparatus in accordance with claim 1, wherein each of the plurality of segments of DSF has substantially zero chromatic dispersion at 1550 nm.

7. An apparatus in accordance with claim 1, wherein each of the plurality of optical signals is modulated in accordance with a quadrature phase shift keying (QPSK) modulation format.

8. An apparatus in accordance with claim 1, wherein each of the plurality of wavelengths is within a range of 1530 nm to 1565 nm.

9. An apparatus comprising:
an optical transmitter block supplying a plurality of optical signals,
each of the plurality of optical signals having a corresponding wavelength of a plurality of wavelengths, and
each of the plurality of optical signals being modulated in accordance with a phase modulation format;
an optical combiner configured to:
combine the plurality of optical signals, and
supply the plurality of optical signals as a wavelength division multiplexed signal to an optical communication path including a plurality of segments of dispersion shifted fiber (DSF);
a plurality of optical amplifiers coupled to the optical communication path,
each of the plurality of optical amplifiers being coupled between a respective first segment of the plurality of segments of DSF and a respective second segment of the plurality of segments of DSF,
a first optical amplifier, of the plurality of optical amplifiers, including a first segment of erbium doped optical fibers, a second segment of erbium doped optical fibers, and a first segment of dispersion compensation fiber (DCF) located between the first segment of erbium doped optical fibers and the second segment of erbium doped optical fibers,
the first segment of DCF having a positive dispersion that is at least 10 ps/nm, and
a second optical amplifier, of the plurality of optical amplifiers, including a third segment of erbium doped optical fibers, a fourth segment of erbium doped optical fibers, and a second segment of DCF located between the third segment of erbium doped optical fibers and the fourth segment of erbium doped optical fibers,
the second segment of DCF having a positive dispersion that is at least 10 ps/nm;
a plurality of other segments of DCF,
each of the other segments of DCF being different than the first segment of DCF and the second segment of DCF,
each of the plurality of other segments of DCF being coupled between the optical combiner and an optical decombiner; and
an optical receiver node having an input coupled to an end portion of the optical communication path,
wherein a Q value associated with an optical signal, of the plurality of optical signals, and having a wavelength substantially equal to 1550 nm, is at least equal to 10.

10. An apparatus in accordance with claim 9,
wherein the optical communication path has an associated non-zero chromatic dispersion at the input of the optical receiver node.

11. An apparatus in accordance with claim 9, wherein each of the plurality of other segments of DSF has an associated chromatic dispersion that is substantially zero dispersion at 1550 nm.

12. An apparatus in accordance with claim 10, wherein the non-zero chromatic dispersion is associated with a wavelength of light of 1550 nm.

13. An apparatus in accordance with claim 9 wherein each of the plurality of optical signals carries a corresponding data stream of a plurality of data streams, each of the plurality of data streams being different from one another.

14. An apparatus in accordance with claim 9, wherein each of the plurality of segments of DSF has substantially zero chromatic dispersion at 1550 nm.

15. An apparatus comprising:
an optical transmitter block supplying a corresponding optical signal of a plurality of optical signals,
each of the plurality of optical signals having a corresponding wavelength of a plurality of wavelengths, and
each of the plurality of optical signals being modulated in accordance with a phase modulation format;
an optical combiner which is configured to combine the plurality of optical signals;
an optical communication path including a plurality of segments of dispersion shifted fiber (DSF),
the optical combiner supplying the plurality of optical signals as a wavelength division multiplexed signal to the optical communication path;
a plurality of optical amplifiers coupled to the optical communication path,
each of the plurality of optical amplifiers being coupled between a respective first segment of the plurality of segments of DSF and a respective second segment of the plurality of segments of DSF,
a first optical amplifier, of the plurality of optical amplifiers, including a first segment of erbium doped optical fibers, a second segment of erbium doped optical fibers, and a first segment of dispersion compensation fiber (DCF) located between the first segment of erbium doped optical fibers and the second segment of erbium doped optical fibers,
the first segment of DCF having a positive dispersion that is at least 10 ps/nm, and
a second optical amplifier, of the plurality of optical amplifiers, including a third segment of erbium doped optical fibers, a fourth segment of erbium doped optical fibers, and a second segment of DCF located between the third segment of erbium doped optical fibers and the fourth segment of erbium doped optical fibers,
the second segment of DCF having a positive dispersion that is at least 10 ps/nm;
a plurality of other segments of DCF,
each of the other segments of DCF being different than the first segment of DCF and the second segment of DCF,
each of the plurality of other segments of DCF being coupled between the optical combiner and an optical decombiner; and
an optical receiver having an input coupled to an end portion of the optical communication path.

16. An apparatus comprising:
an optical transmitter block supplying a plurality of optical signals,
each of the plurality of optical signals having a corresponding wavelength of a plurality of wavelengths, and
each of the plurality of optical signals being modulated in accordance with a phase modulation format;
an optical combiner configured to:
combine the plurality of optical signals, and
supply the plurality of optical signals as a wavelength division multiplexed signal to an optical communication path including a plurality of segments of low dispersion fiber;
a plurality of optical amplifiers coupled to the optical communication path,
each of the plurality of optical amplifiers being coupled between a respective first segment of the plurality of segments of low dispersion fiber and a respective second segment of the plurality of segments of low dispersion fiber,
a first optical amplifier, of the plurality of optical amplifiers including a first segment of erbium doped optical fibers, a second segment of erbium doped optical fibers, and a first segment of low dispersion fiber located between the first segment of erbium doped optical fibers and the second segment of erbium doped optical fibers,
the first segment of low dispersion fiber having a positive dispersion that is at least 10 ps/nm, and
a second optical amplifier, of the plurality of optical amplifiers, including a third segment of erbium doped optical fibers, a fourth segment of erbium doped optical fibers, and a second segment of low dispersion fiber located between the third segment of erbium doped optical fibers and the fourth segment of erbium doped optical fibers,
the second segment of low dispersion fiber having a positive dispersion that is at least 10 ps/nm;
a plurality of segments of dispersion compensation fiber (DCF),
each of the plurality of segments of DCF being coupled between the optical combiner and an optical decombiner; and
an optical receiver having an input coupled to an end portion of the optical communication path.

* * * * *